Jan. 13, 1931.  H. E. STONEBRAKER  1,788,639
METHOD OF CUTTING CURVED TOOTH GEARS
Filed March 22, 1928
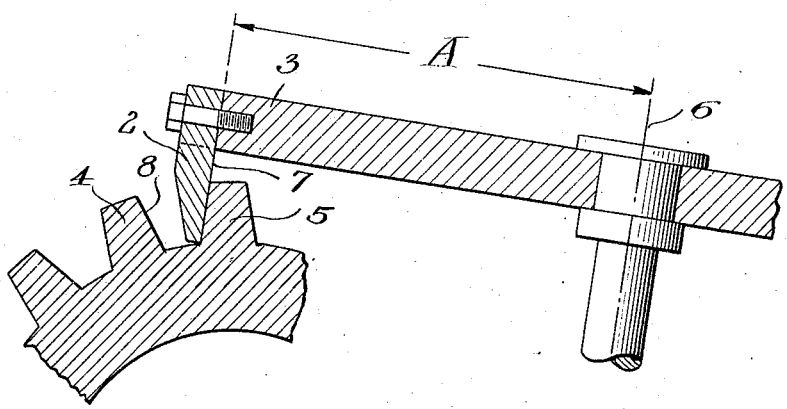
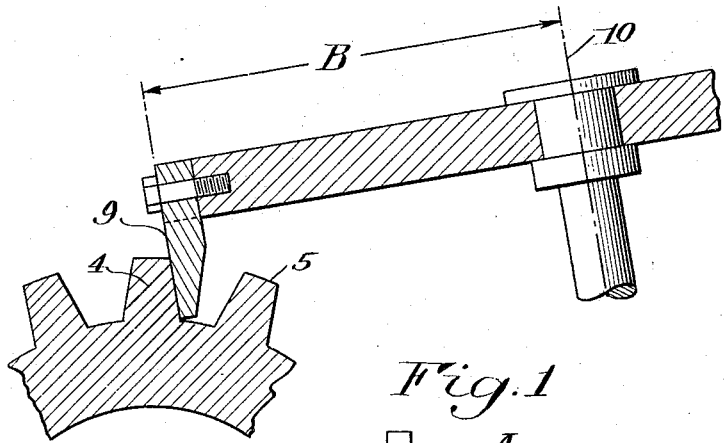
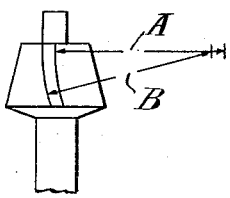
INVENTOR
Harold E. Stonebraker Patented Jan. 13, 1931

1,788,639

UNITED STATES PATENT OFFICE

HAROLD E. STONEBRAKER, OF ROCHESTER, NEW YORK

METHOD OF CUTTING CURVED-TOOTH GEARS

Application filed March 22, 1928. Serial No. 263,906.

This invention relates to curved tooth gears, or what are sometimes commercially termed spiral or circular gears, and has for one of its objects to produce a lengthwise curved tooth of the same cross-section and strength throughout its length, and with faces of uniformly smooth and accurate finish, resulting in a gear of greater efficiency and more quiet in operation than those heretofore in general use.

One general practice in cutting curved tooth gears has been to rotate an annular face mill about an axis perpendicular to a plane tangent to the pitch surface of the gear and in order to obtain the desired inclination of tooth face, the cutting edge of the tool is correspondingly inclined to the axis of rotation of the cutter head. Consequently, the cutting edge sweeps out a conical surface, and the tooth surfaces are therefore sections of cones.

This practice has certain disadvantages, among which is that a tooth so produced varies in cross-section between its ends, so that its strength and the bearing qualities of its faces are likely to vary at different points lengthwise of the tooth. In such a gear, the tooth face bearing may be good at the center and poor at the ends, and such deficiencies quickly cause a gear to wear and become noisy.

One of the virtues of a curved tooth gear is overlap of the teeth, resulting in quieter action, and the desired ideal is to secure this along with other advantages of the curved tooth gear, and at the same time retain the uniform bearing and strength characteristics of the straight tooth gear, factors which cannot be had where a conical section is formed by the cutting edge of a tool.

More particularly, the object of the invention is to bring about these desired results by producing a gear in which the tooth faces are parts of cylindrical sections rather than conical sections. The cylindrical section is produced by maintaining the cutting edge parallel to the axis about which it travels arcuately. Where the cutting edge is thus held parallel to the axis of movement of the cutter, a finer, smoother, and more accurate surface is produced than where different parts of the cutting edge are at different distances from the axis about which the cutter moves, as where a conical section is cut by the conventional face mill cutter heretofore employed in producing curved tooth gears.

The invention comprehends certain other objects and advantages, all of which will appear from the following description when read in conjunction with the accompanying drawings, the novel features being pointed out in the claims.

In the drawings:

Figure 1 is a plan view of a portion of a pinion made according to the invention;

Figure 2 is a sectional view illustrating one possible disposition of cutter for producing one tooth face on one side of a tooth space, and Figure 3 is a similar view illustrating the disposition of a cutter for producing the opposite tooth face on the other side of the tooth space.

The invention herein disclosed is applicable to curved tooth gears generally, either of the spur type which is illustrated or of the bevel type, or wherever a lengthwise curved tooth is desirable, and the principle is applicable and intended to be used in cutting involute or generated gears, where a relative rolling motion takes place between the gear blank and cutter during the cutting operation, as well understood in the gear manufacturing art.

In the construction illustrated, 1 designates a portion of a spur gear and 2 is a tool shown mounted upon a cutter 3 and travelling in a tooth space or groove between adjacent teeth 4 and 5. The cutter 3 may rotate about the axis 6, and 7 designates the cutting edge of the tool which engages the adjacent surface of the tooth 5 and is parallel to the axis 6 about which the cutter travels. Thus the cutting edge 7 of the tool sweeps out a cylindrical surface on the tooth so that the tooth face is composed of elements of a cylinder, resulting in a uniform tooth cross-section from end to end and uniform inclination of the tooth face.

The tooth face 8 on the opposite side of the tooth space would be produced by another cutter arranged as shown in Figure 3 with its cutting edge 9 parallel to the axis 10 about which the cutter travels. The radius A, Figure 2, which determines the arc of travel of the cutting edge 7 that forms the face on tooth 5, is the same as radius B, Figure 3, which determines the arc of travel of cutting edge 9 that forms the adjacent face 8 on tooth 4. In this manner are produced teeth and spaces defined by faces having the same curvature and comprising a similar section of the same cylinder.

While a particular cutter has been shown for purposes of explanation, it will be understood that a gear embodying the invention may be cut with a continuously rotating cutter or with an oscillating cutter, and it is also within the province of the invention to use two cutters operating on two tooth faces at the same time. Other types of cutters may be used and different procedure followed without departing from the underlying novel features of the improvement, and this application is intended to cover any modifications or adaptations coming within the spirit of the invention, or the scope of the following claims.

I claim:

1. The method of cutting a gear having teeth that are curved endwise across the gear face, consisting in moving a tool in an arcuate path across the gear face, said tool having a straight cutting edge arranged parallel to the axis about which the tool travels and acting to produce a cylindrical-like surface.

2. The method of cutting a gear having teeth that are curved endwise across the gear face, consisting in producing adjacent faces by moving two tools about different axes arranged angularly to each other, said tools having straight cutting edges arranged parallel to the axes about which they move and acting to sweep out cylindrical-like surfaces.

3. The method of cutting a gear having teeth that are curved endwise across the gear face, consisting in producing adjacent faces by moving two different tools in different curved paths across the gear face and about different axes arranged angularly to each other, each cutting tool having a cutting edge in parallel relationship to the axis about which the tool travels.

In witness whereof, I have hereunto signed my name.

HAROLD E. STONEBRAKER.